United States Patent [19]
Langhans et al.

[11] Patent Number: 4,634,571
[45] Date of Patent: Jan. 6, 1987

[54] PROCESS FOR THE PRODUCTION OF PLATE-SHAPED FUEL ELEMENTS FOR RESEARCH REACTORS

[75] Inventors: Horst Langhans, Klingenberg; Erwin Wehner, Neu Isenburg, both of Fed. Rep. of Germany

[73] Assignee: NUKEM GmbH, Hanau, Fed. Rep. of Germany

[21] Appl. No.: 708,474

[22] Filed: Mar. 5, 1985

[30] Foreign Application Priority Data

Mar. 7, 1984 [DE] Fed. Rep. of Germany ....... 3408240

[51] Int. Cl.$^4$ ................................................ G21C 3/00
[52] U.S. Cl. .................................... 376/416; 252/636; 252/637; 252/640; 264/0.5; 376/414; 419/32; 419/69
[58] Field of Search ................. 376/416, 414; 252/637, 252/636, 640; 264/0.5; 419/32, 67

[56] References Cited

U.S. PATENT DOCUMENTS

| | | | |
|---|---|---|---|
| 2,894,890 | 7/1959 | Saller et al. | 376/416 |
| 3,097,152 | 7/1963 | Walker | 376/416 |
| 3,297,543 | 1/1967 | Jessen et al. | 376/416 |
| 4,224,106 | 9/1980 | Delafosse | 376/416 |

Primary Examiner—Stephen J. Lechert, Jr.
Attorney, Agent, or Firm—Cushman, Darby & Cushman

[57] ABSTRACT

For the production of plate-shaped fuel elements for research reactors having charges of more than 26 volume % of uranium compound in the aluminum matrix according to the known picture frame technique, 0.01 to 0.3 mm thick aluminum layers are applied by rolling to the picture before inserting it into the frame in order to avoid dragging the uranium into the fuel-free zones.

10 Claims, No Drawings

PROCESS FOR THE PRODUCTION OF PLATE-SHAPED FUEL ELEMENTS FOR RESEARCH REACTORS

BACKGROUND OF THE INVENTION

The invention is directed to a process for the production of plate-shaped fuel elements for research and material testing reactors having loads of more than 26 volume % uranium compounds, by mixing the powdered uranium compounds with aluminum powder, molding to a plate-shaped molded body, enclosing the molded body in an aluminum jacket, and inserting it into an aluminum plate having a cutout corresponding to the molded body, covering the molded body and the aluminum plate on both sides with two aluminum sheets and rolling this packet.

It is known to produce plate-shaped fuel elements for research and material testing reactors according to the so-called picture frame technique. Thereby, first the actual fuel nucelus of this fuel element is produced first from a mixture of suitable fuel powder with aluminum powder in the form of a flat platelet, which customarily is called a picture. This picture is fitted into a frame of comparable thickness and covered above and below with two sheets. Frame and covering sheets are manufactured of aluminum or aluminum alloys. The sandwich-like "packet" formed is welded locally laterally and then rolled out in several rolling passes to a plate. Consequently, the finished fuel element consists of an aluminum or aluminum alloy plate which in the interior encloses a fuel containing zone made of a uranium compound in an aluminum matrix. Corresponding to the construction of this fuel zone, there is talk of dispersion nuclear fuels. As fuels, uranium compounds such as the oxide, silicide, aluminide, or ferride are employed.

The construction of such plate-shaped fuel elements is carried out in each case depending on the requirements of the research or material testing reactor to be loaded. Depending on the capacity of the reactor, the uranium content must be higher or lower in the fuel zone. With the customary standard fuel elements which are produced with insertion of highly enriched uranium, the portion of uranium compound in the fuel zone has a value between 7 and 26 volume percent.

However, the reactors and the corresponding fuel elements can also be changed over to receive lower enriched uranium. While highly enriched uranium contains 80 to 93 weight % of the fissionable isotope U-235, the U-235 portion of lower enriched uranium shrinks to a maximum of 20 wt.%.

To maintain the reactor capacity in the change over from highly enriched uranium to fuel elements with lower enriched uranium, the uranium density in the fuel must be raised correspondingly. With a reactor having a lower capacity, this leads to a raising of the uranium density in the fuel zone, e.g., from 0.5 to 2.4 grams U/cm$^3$, with a reactor of higher capacity from, e.g., 1.3 to 7.0 grams U/cm$^3$.

If the uranium compound portion of a dispersion fuel is limited to 26 vol.% because of manufacturing reasons, then even with insertion of high density uranium fuels, such as U$_3$Si (density 15.6 g/cm$^3$) in the fuel zone, there can be attained at most a uranium density of 3.9 grams U/cm$^3$. U$_3$O$_8$ customarily used as fuel leads to a maximum of 1.9 grams U/cm$^3$. A production of dispersion nuclear fuel elements with lower enriched uranium for research reactors of average and higher capacity, therefore, is not possible with the known manufacturing techniques since higher volume portions of uranium compounds are necessary in the aluminum matrix.

A further increase of the uranium density in the fuel zone can only be attained by way of a higher volume loading with the uranium compound. In corresponding experiments, it has been shown that from the viewpoint of formability of the picture in the rolling process and maintaining suitable matrix properties in the finished plates, it is possible to increase to about 45 vol. % of uranium compound in the fuel zone.

However, fuel elements produced from such pictures according to the standard technique, consisting of insertion of the pressed, fuel-aluminum-molded body into an aluminum frame, covering with sheets, welding laterally to a roll packet, and rolling cannot be sufficient in an important point in regard to strength quality requirements placed on the reactor operation.

In a plate-shaped fuel element, the geometry of the uranium containing zone is exactly prescribed. Fuel particles outside this rectangular zone, thus in the surrounding aluminum or aluminum alloy zone, are detected in radioscopy and lead to rejection of the plate in question.

While the maintenance of the fuel zone geometry with fuel elements having a volume loading of a maximum of 26 vol. % uranium compound causes no problem, pictures with higher volume loadings lead to fuel elements which show occlusions of small fuel particles outside the specified fuel zone. The cause of this is the relatively brittle material properties of the highly laden picture which leads to abrading or chipping off of small fuel containing particles, which fall between the frame surrounding the picture and the cover sheet and as a consequence are rolled in there. These particles are customarily designated as "white points" because they appear as such in the radioscopy picture of the X-ray examination.

There is described in British Pat. No. 1,071,363 (the entire disclosure of which is hereby incorporated by reference) a process for positioning the picture in the roll packet in which the picture is mounted in the frame with addition sheet insertions and before the rolling is completely enclosed by welding these sheets with the frame cutout. However, this technique is not suitable for the production of fuel elements with higher volume loading of nuclear fuel since it is very expensive and cumbersome. Besides, the described welding of the picture leads to high production waste due to occluded air which cannot escape in the rolls and leads to bonding failures, such as about bubbles in the finished fuel element. Besides, the occurrence of "white points" also cannot be reliably prevented in the fuel-free zone with this technique since these already have been caused in the assembling of picture and frame. The occurrence of uranium at least in the welding seam of the described welded roll packet likewise is not preventable since in rolling these plates the welding seam is also stretched and the "white points" therewith get into the zone specified as uranium free. Such plates, therefore, are unsuitable for insertion in the reactor.

Therefore, it was the problem of the present invention to develop a process for the production of plate-shaped fuel elements for research and material testing reactors with loads of more than 26 vol. % of uranium compounds by mixing the powdery uranium compounds with aluminum powder, pressing to a platelet-shaped molded body, enclosing the molded body in an aluminum jacket, and inserting it into an aluminum plate having a cutout corresponding to the molded body, covering the molded body and the aluminum plate on both sides with two aluminum sheets and rolling this packet.

SUMMARY OF THE INVENTION

The problem was solved according to the invention by applying a 0.01 to 0.3 mm thick aluminum layer as a jacket directly on the platelet-shaped molded body.

Preferably, the thin aluminum layer is applied to the platelet-shaped molded body by spraying or vapor deposition.

In order to manufacture the aluminum jacketed fuel picture, first a mixture of aluminum powder and fuel powder is pressed to tabular pictures in known manner. If necessary, lubricant additives are removed from these pictures by a temperature treatment. The thus produced pictures are mounted on a rotatable support in such manner that it is possible to coat all sides and edges. Then there is applied a surrounding thin aluminum layer by thermal spraying or by thermal deposition in an evacuated plant. Thereby, the layer thickness can be adjusted in a simple manner by dosaging the spraying or vapor source or above all by the coating time used per surface. The coating layer should be 0.01 to 0.3 mm thick, preferably there is chosen a coating having a thickness of 0.05 to 0.1 mm.

Surprisingly, it has been found that thin aluminum coatings of 0.01 to 0.3 mm impart a completely different manipulative usefulness to the picture. While a non-aluminum coated picture having a higher uranium loading, for example 45 vol. % of uranium compound dispersed in an aluminum matrix is so brittle that it could be used as a writing chalk for marking, this is not possible with an aluminum coated picture. The thin aluminum layer is obviously sufficiently elastic that the effect of the brittle base is masked without preventing the escape of air in rolling.

Thus, produced aluminum coated dispersion fuel pictures can be manufactured with the known process for the production of plate-shaped fuel elements for research and material testing reactors without problem. The picture can be placed in the roll packet consisting of aluminum or aluminum alloy frame and cover sheets without danger of the chipping of the finest fuel particles. After welding laterally, this roll packet is rolled out in several passes to an about six fold length. There has not been noted a negative effect of the aluminum protective layer in either this step or in subsequent steps. The bond between picture and frame employing structural material made of aluminum alloys can even be clearly improved by the aluminum intermediate layer. The occurrence of "white points" outside the fuel zone are reliably prevented. Uranium containing particles are no longer detectable radiographically outside the fuel containing zone. Therewith, it is possible in a problem-free manner to maintain in the geometry narrow, specified fuel zones. Experiments have shown that the favorable effect of the aluminum coating is independent of the type and concentration of the fuel employed and of the choice of structural material. Although it appears that aluminum or aluminum alloys are especially suitable, the technique of coating the picture is also usable with other structural materials or frame matrices.

The process can comprise, consist essentially of, or consist of the stated steps with the recited materials.

The following examples illustrate the process of the invention in more detail.

EXAMPLE 1

There were pressed tabular-shaped pictures having the dimensions $100 \times 61 \times 3$ mm from aluminum powder and $U_3O_8$ powder homogeneously mixed in the weight ratio of 0.3 to 1 with a molding pressure of around 600 mPa. The pictures calcined in customary manner were fixed to a rotatable device and were coated on all sides to a coating thickness of 0.1 mm using a flame spray gun with an oxyhydrogen flame and continuously supplying aluminum powder. The thus produced aluminum coated dispersion fuel pictures were inserted in a frame made of an aluminum alloy having an appropriate cutout ($100 \text{ m} \times 61$ mm) and provided with cover sheets of the same alloy. The thus formed roll packet was partially welded laterally and rolled out hot or cold in several passes of the roll to form plates having six times the length of the original roll packet. The finished fuel plates correspond in all respects to those set forth in the specification requirements.

EXAMPLE 2

Aluminum powder and $U_3Si_2$ powder were homogeneously mixed in the weight ratio 0.27:1 and worked in accordance with Example 1 to pictures having the dimensions $18 \times 44 \times 3$ mm. The thus produced pictures were mounted on a rotatable device and inserted in the vaporization space of a vapor deposition apparatus. They were coated there on all sides while under vacuum with the vapor of an aluminum source to form an aluminum layer having a thickness of 0.04 mm. The further processing of the aluminum coated pictures was carried out in a manner analogous to Example 1.

The entire disclosure of German priority application P.3408240.9 is hereby incorporated by reference.

What is claimed is:

1. In a process for the production of plate-shaped fuel elements suitable for use in research and material testing reactors having loads of more than 26 volume % of uranium compound by mixing the powdered uranium compounds with aluminum powder, molding to a plate-shaped molded body, enclosing the molded body in an aluminum jacket and inserting it into an aluminum plate having a cutout corresponding to the molded body, covering the molded body and the aluminum plate on both sides with two aluminum sheets and rolling this packet, the improvement comprising applying a jacket of a 0.01 to 0.3 mm thick aluminum coating directly on the plate-shaped molded body before placing it in the aluminum jacket.

2. A process according to claim 1 wherein the aluminum coating has a thickness of 0.05 to 0.1 mm.

3. A process according to claim 1 comprising applying the aluminum coating by thermal spraying.

4. A process according to claim 1 comprising applying the aluminum coating by vapor deposition.

5. A process according to claim 1 wherein there is employed $U_3O_8$, $U_3Si$, or $U_3Si_2$.

6. A plate-shaped molded body prepared by the process of claim 1.

7. A plate-shaped molded body according to claim 6 wherein the uranium compound is $U_3O_8$, $U_3Si$, or $U_3Si_2$.

8. A plate-shaped molded body according to claim 7 wherein the uranium compound is $U_3Si_2$.

9. A plate-shaped molded body according to claim 7 wherein the uranium compound is $U_3O_8$.

10. A plate-shaped molded body prepared by the process of claim 2.

* * * * *